United States Patent

Suzuki

[11] Patent Number: 6,080,961
[45] Date of Patent: Jun. 27, 2000

[54] BLANK MATERIAL POSITIONING DEVICE AND BLANK MATERIAL POSITIONING METHOD

[75] Inventor: Shunji Suzuki, Yokohama, Japan

[73] Assignee: Nissan Motor Co., Ltd., Yokohama, Japan

[21] Appl. No.: 08/959,274

[22] Filed: Oct. 28, 1997

[30] Foreign Application Priority Data

Oct. 31, 1996 [JP] Japan ................................ 8-290278
Nov. 1, 1996 [JP] Japan ................................ 8-292004

[51] Int. Cl.[7] ............................ B23K 26/02; B23K 26/24; B23K 37/04
[52] U.S. Cl. ...................... 219/161; 219/121.63; 228/44.3
[58] Field of Search ...................... 219/101, 102, 219/121.63, 158, 161; 228/44.3; 269/37, 43, 289 R, 303

[56] References Cited

U.S. PATENT DOCUMENTS

| | | | |
|---|---|---|---|
| 4,626,651 | 12/1986 | Taniguchi et al. | 219/121.63 |
| 4,840,303 | 6/1989 | Fujii et al. | 219/121.63 X |
| 5,266,770 | 11/1993 | Noe | 219/121.63 |
| 5,532,450 | 7/1996 | Iwai et al. | 219/121.63 |
| 5,614,112 | 3/1997 | Peru et al. | 219/121.63 |
| 5,630,269 | 5/1997 | Wasserbaech et al. | 228/44.3 X |
| 5,674,420 | 10/1997 | Broderick et al. | 219/158 |
| 5,814,786 | 9/1998 | Johnson et al. | 29/121.63 |

FOREIGN PATENT DOCUMENTS

| | | |
|---|---|---|
| 63-165072 | 7/1988 | Japan . |
| 5-161994 | 6/1993 | Japan ...................... 219/121.63 |
| 6-304786 | 11/1994 | Japan . |
| 7-284993 | 10/1995 | Japan . |

Primary Examiner—Gregory Mills
Attorney, Agent, or Firm—McDermott, Will & Emery

[57] ABSTRACT

Corresponding edge faces of first and second blank materials disposed in a horizontal plane are aligned on a predetermined welding line. A positioning member is provided which comes in contact with and can be withdrawn from one edge face of the first blank material on the welding line. A base end of the first blank material is supported by a supporting mechanism, the vicinity of one end face of the first blank material is gripped by the first clamp, the first clamp withdraws from the welding line so as to cause the first blank material to buckle. In this state, the first blank material is pressed against the positioning member and fixed by a second clamp. In this way, the end face of the first blank material is precisely positioned on the welding line. After the withdrawal of the positioning member from the welding line, the second blank material is pressed against the first blank material until the second blank material is buckled. In this way the blank materials are brought into intimate contact without any gaps between them.

7 Claims, 12 Drawing Sheets

BLANK MATERIAL POSITIONING DEVICE AND BLANK MATERIAL POSITIONING METHOD

FIELD OF THE INVENTION

This invention relates to butt welding of blank materials.

BACKGROUND OF THE INVENTION

In a car external panel manufacturing process as is disclosed in for example Tokkai Sho 63-165072, published by the Japanese Patent Office in 1988, blank materials having different specifications are aligned, welded by a laser beam, and formed into a predetermined shape by a press. This process is widely used.

In this case, when there is a gap due to an error in the processing of the blank materials when one blank is aligned with another blank, laser welding does not proceed well and welding quality falls. When there is a gap of more than 0.1 mm in particular, welding defects are easily produced.

Also, when the plurality of edges of the blank materials are aligned to be welded and there is a dimensional error in the welding part of one of the edges, its effect may extend to the welding part of the other edges.

SUMMARY OF THE INVENTION

It is therefore an object of this invention to appropriately correct a gap in a join part when a plurality of blanks are aligned and welded together to form a frame.

In order to achieve the above object, this invention provides a blank material positioning device for aligning first and second blank materials disposed in a horizontal plane such that edges of the blank materials are aligned on a predetermined welding line.

The positioning device comprises a positioning member which comes in contact with and is capable of separating from an edge face of the first blank material on the welding line, a first clamp for gripping the first blank material from above and beneath the first blank material, a first actuator for driving the first clamp in a perpendicular direction to the welding line in a horizontal plane, a second clamp for fixing the first blank material, of which one edge face is in contact with the positioning member, a mechanism for horizontally supporting the first blank material, and a mechanism for driving the second blank material towards the welding line.

It is preferable that the positioning member comprises a plurality of pins which extend and contract vertically and are disposed along the welding line.

It is also preferable that the first clamp is constructed so as to permit a rotational displacement in a horizontal plane of the first blank material.

It is further preferable that the first clamp comprises a first lower pedestal base situated under the first blank material, a first clamp member facing the first lower pedestal base from above and capable of rotating relative to the first lower pedestal base, and a second actuator for driving the first clamp member towards the first lower pedestal base, the first actuator being an actuator for driving the first lower pedestal base and first clamp member in a perpendicular direction to the welding line in a horizontal plane.

It is still further preferable that the device further comprises a guide for guiding the first lower pedestal base and first clamp member in a perpendicular direction to the welding line.

It is also preferable that the horizontally supporting mechanism comprises a second lower pedestal base situated under the first blank material, a second clamp member facing the second lower pedestal base from above and capable of rotating relative to the second lower pedestal base, a third actuator for driving the second clamp member towards the second lower pedestal base, and a fourth actuator for supporting the second clamp member and second lower pedestal base against a horizontal load.

This invention also provides a blank material positioning device for aligning one edge of a first blank material disposed in a horizontal plane on a first welding line together with one edge of a second blank material, and aligning another edge of the first blank material on a second welding line together with one edge of a third blank material.

The positioning device comprises a pair of first clamps situated on either side of the first blank material in the vicinity of the first welding line for gripping the first blank material, a pair of second clamps situated on either side of the first blank material in the vicinity of the second welding line for gripping the first blank material, an actuator for driving the pair of first clamps in a perpendicular direction to the first welding line in a horizontal plane, and an actuator for driving the pair of second clamps in a perpendicular direction to the second welding line in a horizontal plane.

It is preferable that the first and second clamps each comprise a pedestal base for mounting the first blank material, a pin which projects upwards from the pedestal base and a clamper fixed to the pin, an actuator for rotating each pin, an actuator for driving each pin in an up/down direction, and an actuator for driving each pedestal base in a perpendicular direction to the welding line in a horizontal plane.

It is further preferable that the pin engages with a notch formed on the first blank material.

This invention also provides a blank material positioning device for aligning first and second blank materials disposed in a horizontal plane such that edges of the blank materials are aligned on a predetermined welding line, comprising a pair of first clamps situated on either side of the first blank material in the vicinity of the welding line for gripping the first blank material, a base end clamp for gripping an edge of the first blank material which is situated opposite to the welding line, and an actuator for driving the pair of first clamps in a perpendicular direction to the welding line in a horizontal plane.

This invention also provides a blank material positioning method for aligning one edge of a first blank material disposed in a horizontal plane on a first welding line together with one edge face of a second blank material, and aligning another edge face of the first blank material on a second welding line together with one edge face of a third blank material.

The positioning method comprises the steps of gripping the first blank material by first clamps situated on either side in the vicinity of the first welding line, gripping the first blank material by second clamps situated on either side in the vicinity of the second welding line, applying a load to the first blank material in such a direction as to cause the first clamps and the second clamps to approach each other in order to cause the first blank material to buckle, and bringing edge faces of the first blank material in contact with the edge faces of the second blank material and the third blank material in a state where the first blank material is buckled due to the load.

It is preferable that the first blank material gripping step by the first clamps comprises a step for engaging the first clamps with notches formed in the first blank material, and the first blank material gripping step by second clamps comprises a step for engaging the second clamps with notches formed in the first blank material.

The details as well as other features and advantages of this invention are set forth in the remainder of the specification and are shown in the accompanying drawings.

DESCRIPTION OF THE PREFERRED EMBODIMENTS

Figure 1:
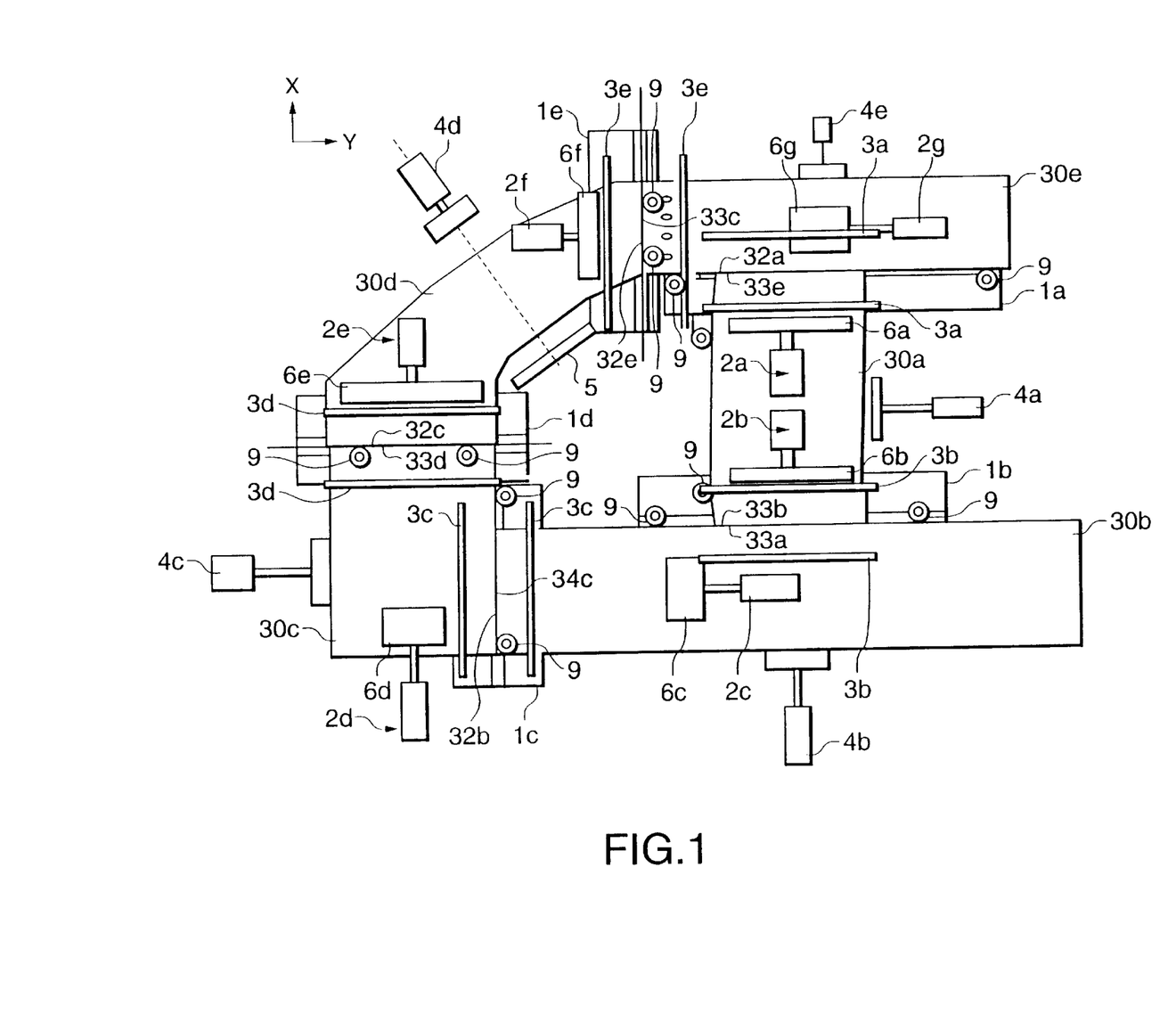
FIG. 1 is a schematic plan view of a blank material positioning device according to this invention.

Referring to FIG. 1 of the drawings, a blank material positioning device is provided for assembling the join parts of five blank materials 30a–30e by laser beam welding in order to form a rear quarter pillar of an automobile.

As shown in FIG. 1, blank materials 30a, 30c are disposed substantially parallel to each other in the X axis direction of the figure. Blank materials 30b, 30e are disposed substantially parallel to each other in the Y axis direction.

A blank material 30d which is also referred to as a first blank material, is arranged at an inclination between the blank materials 30c, 30e. The blank material 30e is also referred to as a second blank material. A welding part 33d of the lower edge of the blank material 30d is formed parallel to the Y axis, and a welding part 33c of the upper edge is formed parallel to the X axis.

The join parts of the blank materials 30a–30e are supported on center blocks 1a–1e. The center block 1a supports one edge of the blank material 30a and a side face of the blank material 30e. The center block 1b supports the other edge of the blank material 30a and a side face of the blank material 30b. The center block 1c supports one edge of the blank material 30b and a side face of the blank material 30c. The center block Id supports one edge of the blank material 30c and one edge of the blank material 30d. The center block 1e supports one edge of the blank material 30d and one edge of the blank material 30e.

Figure 2:
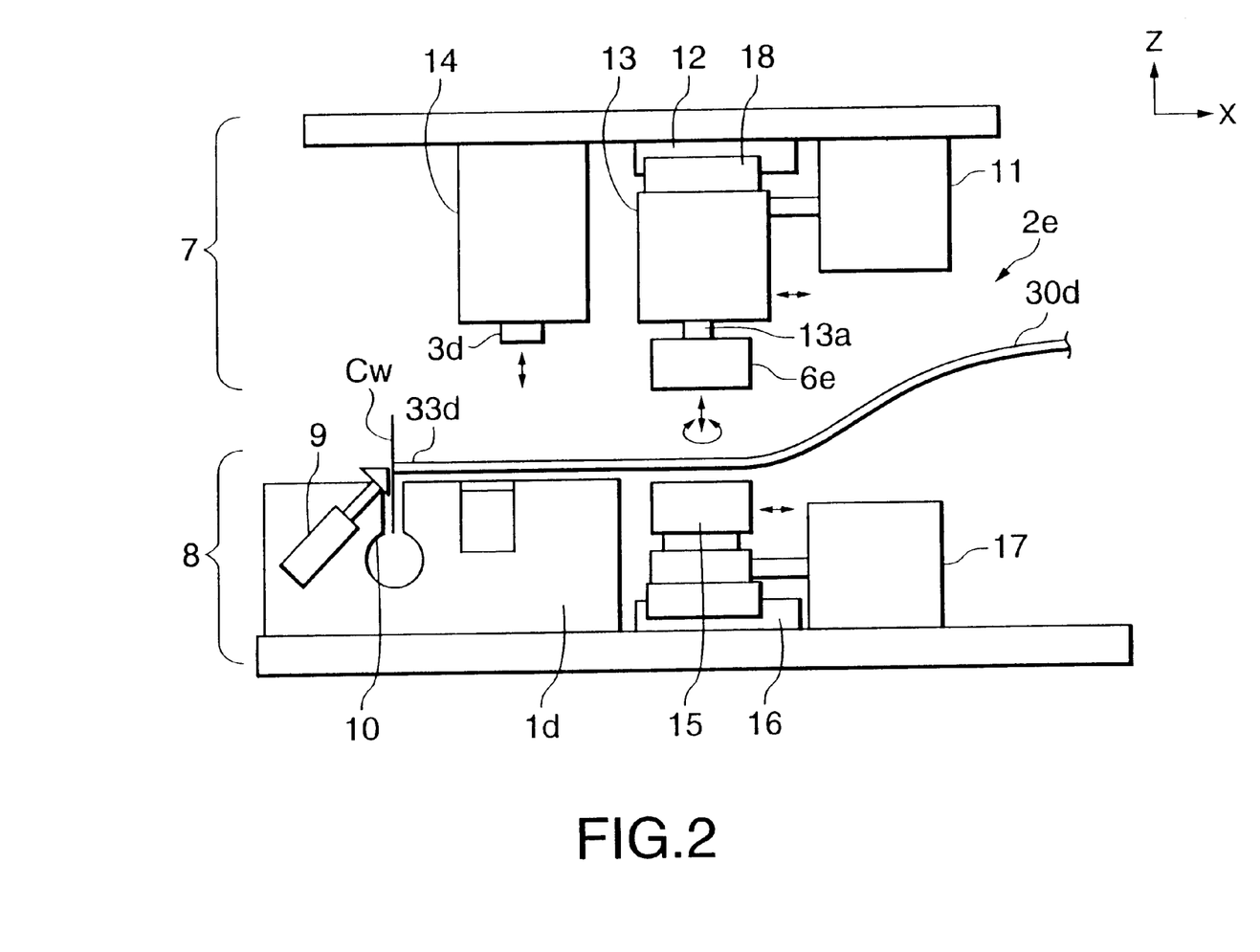
FIG. 2 is a vertical sectional view of the essential parts of the positioning device.

A groove 10 is formed on a welding line Cw of the blank materials on the center blocks 1a–1e as shown in FIG. 2. A laser welding gun, not shown, irradiates the welding line Cw with a laser beam while moving along the welding line Cw on this groove.

A pair of reference pins 9 are provided as a positioning member on the center blocks 1a–1e at a predetermined position of the groove 10 such that they can freely project. The blank materials 30a–30e are respectively positioned over predetermined welding lines by correction clamp units 2a–2g, and are fixed by fixed clampers 3a–3e which push the blank materials 30a–30e against the center blocks 1a–1e. The fixed camper 3e is also referred to as a second clamp.

In FIG. 1, a welding part 32a of the blank material 30a is selectively gripped by the correction clamp unit 2a provided with the correction clamper 6a which can be displaced in the X axis direction.

The welding part 33a is selectively gripped by the correction clamp unit 2b provided with the correction clamper 6b which can be displaced in the X axis direction.

The blank material 30b comprising the welding part 32b and welding part 33b is selectively gripped by the correction clamp unit 2c provided with the correction clamper 6c which can be displaced in the Y axis direction.

The blank material 30c comprising the welding part 32c and welding part 34c is selectively gripped by the correction clamp unit 2d provided with the correction clamper 6d which can be displaced in the X axis direction.

The blank material 30d comprising the welding parts 33d and 33c is selectively gripped by the correction clamp unit 2e provided with the correction clamper 6e which can be displaced in the X axis direction. The blank material 30d is also selectively gripped by the correction clamp unit 2f provided with the correction clamper 6f which can be displaced in the Y direction. The correction clamp unit 2f is also referred to as a first clamp, and the correction clamp unit 2e is also referred to as a supporting mechanism. The correction clamper 6f is also referred to as a first clamp member and the correction clamper 6e is also referred to as a second clamp member.

The blank material 30e comprising the welding part 32e and welding part 33e is selectively gripped by the correction clamp unit 2b provided with the correction clamper 6b which can be displaced in the Y axis direction.

External pushers 4a–4e which perform temporary positioning are arranged on one side of the blank materials 30a–30e which are gripped by the correction clamp units 2a–2g.

The external pusher 4a pushes the blank material 30a mounted on the center blocks 1a and 1b to the left of the FIG. 1 due to the actuator which extends and contracts in the Y axis direction.

One side of the blank material 30a is thereby brought in contact with a pair of reference pins 9 disposed on the center blocks 1a, 1b so as to temporarily position the blank material 30a.

The external pusher 4b pushes the blank material 30b mounted on the center blocks 1c and 1b to the upper part of FIG. 1 due to an actuator which extends and contracts in the X axis direction.

One side of the blank material 30b is thereby brought in contact with the pair of reference pins 9 disposed on the center block 1b so as to temporarily position the blank material 30b.

The external pusher 4c pushes the blank material 30c mounted on the center blocks 1c and 1d to the right side of FIG. 1 due to an actuator which extends and contracts in the Y axis direction.

One side of the blank material 30c is thereby brought in contact with the pair of reference pins 9 disposed on the center block 1c so as to temporarily position the blank material 30c.

The external pusher 4e pushes the blank material 30e mounted on the center blocks 1e and 1a to the lower part of FIG. 1 due to an actuator which extends and contracts in the X axis direction.

One side of the blank material 30e is thereby brought in contact with the pair of reference pins 9 disposed on the center block 1a so as to temporarily position the blank material 30e.

The external pusher 4d pushes the blank material 30d mounted on the center blocks 1d and 1e to the lower right of FIG. 1 due to an actuator which extends and contracts in a direction effectively perpendicular to the blank material 30d. One side of the blank material 30d is thereby brought in contact with a rough guide 5 fixed for example to the floor so as to temporarily position the blank material 30e.

Next, the construction of the correction clamp units 2a–2g and fixed clamper 3a–3e will be described. The specifications of the correction clamp units 2a–2g are identical, and the specifications of the fixed clampers 3a–3e are also identical, therefore in the following discussion, the correction clamp unit 2e and fixed clamper 3d which grip and position the blank material 30d will be described.

Figure 3:
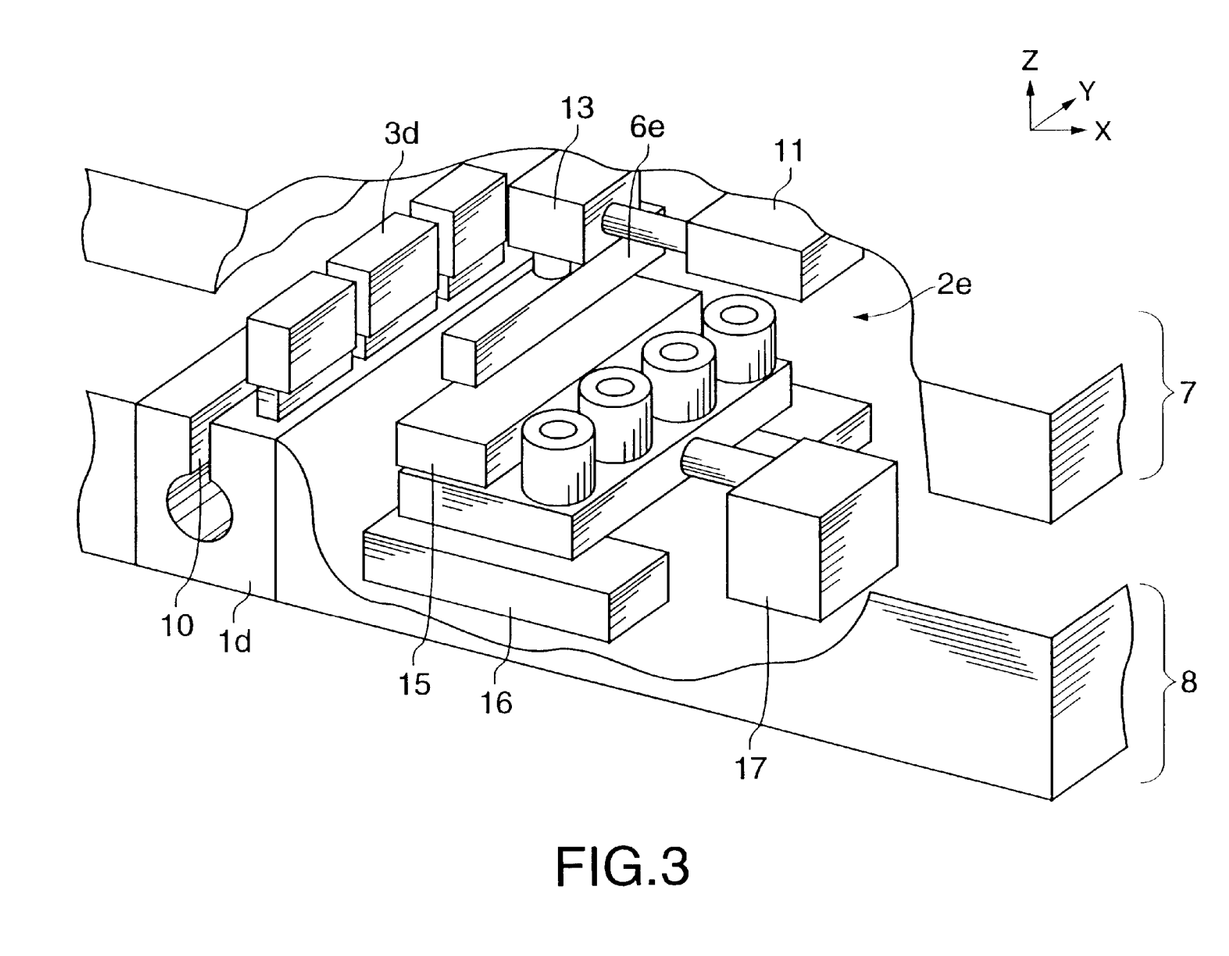
FIG. 3 is a perspective view of the essential parts of the positioning device.

Referring to FIGS. 2 and 3, the welding part 33d of the blank material 30d is mounted on a lower jig 8 comprising the center block 1d fixed on the floor surface and a lower movable pedestal base 15. The lower movable pedestal base 15 of the correction clamp unit 2f is also referred to as a first lower pedestal base and the lower movable pedestal base 15 of the correction clamp unit 2e is also referred to as a second lower pedestal base.

An upper jig 7 comprising the fixed clamper 3d and correction clamper 6e, which is situated above the lower jig 8, associates with the lower jig 8 and selectively grips the welding part 33d, and positions the welding part 33d on the predetermined welding line Cw.

The pair of reference pins 9, which extends to and contracts from the predetermined welding line Cw, are disposed in the groove 10 of the center block 1d constituting the lower jig 8.

The lower mobile pedestal base 15, which can be displaced in the X axis direction on a slider 16, is installed adjacent to the center block 1d. The lower mobile pedestal base 15 is driven by a lower correction actuator 17.

The upper jig 7 comprises the fixed clamper 3d and an upper mobile pedestal base 18. The fixed clamper 3d is disposed at the lower end of the actuator 14, and fixes the blank 30d to the center block 1d after positioning is complete. As also shown in FIG. 1, the fixed clamper 3d is also disposed on the opposite side of the groove 10, i.e. on the side of the blank material 30c.

The upper mobile pedestal base 18 is disposed such that it can be displaced in the X axis direction on a slider 12. The sliders 12, 16 of the correction clamp unit 2f are also referred to as a guide. The upper mobile pedestal base 18 comprises a clamp actuator 13 that can expand and contract in the Z axis direction facing the lower mobile pedestal base 15. The clamp actuator 13 of the correction clamp unit 2f is also referred to as a second actuator and the clamp actuator 13 of the correction clamp unit 2e is also referred to as a third actuator. The correction clamper 6e which may be attached to or detached from the lower mobile pedestal base 15 is supported by a rod 13a at the lower end of the clamp actuator 13. The correction clamper 6e is supported free to rotate about the Z axis as center by the clamp actuator 13.

The upper mobile pedestal base 18 is driven in the X axis direction by the correction actuator 11 which is fixed on the side of the upper jig 7. The correction actuator 11 is driven in synchronism with the lower correction actuator 17 on the side of the lower jig 8, and maintains the correction clamper 6e and lower mobile pedestal base 15 in a state where they permanently face each other. The correction actuators 11, 17 of the correction clamp unit 2f are also referred to as a first actuator and the correction actuators 11, 17 of the correction clamp unit 2e are also referred to as a fourth actuator.

Next, the positioning and fixing of the blank material 30d which has the welding part 33d which extends in the Y axis direction and the welding part 33c which extends in the X direction will be described with reference to FIG. 4–FIG. 7.

Figure 4:
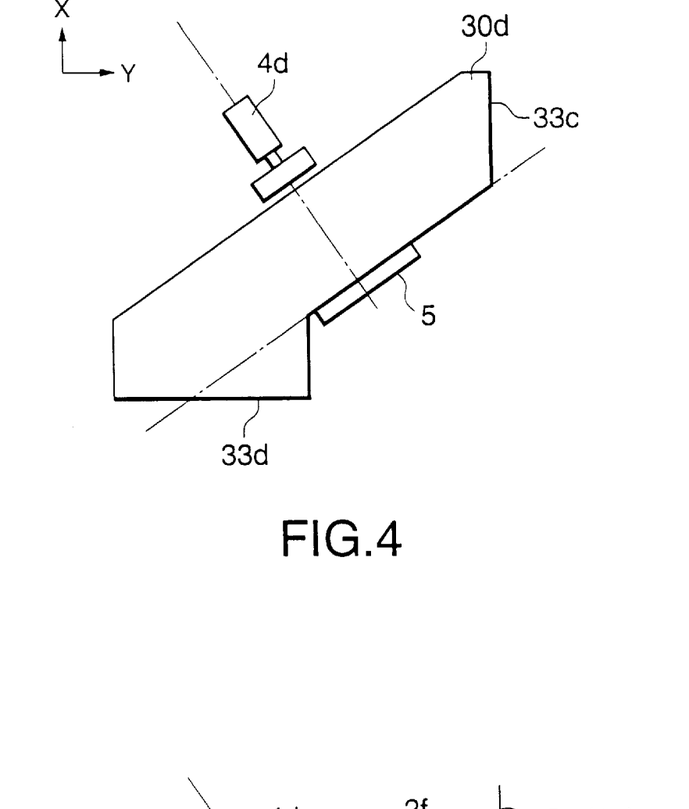
FIG. 4 is a plan view of a blank material showing a temporary positioning state due to the positioning device.

First, the clamp actuator 13, actuator 14 and reference pins 9 shown in FIG. 2 are arranged in their most contracted condition, and after driving the correction actuator 11 and lower correction actuator 17 to a predetermined stroke location, the blank material 30d is placed on the center blocks 1d and 1e as shown in FIG. 4. At this time, the blank materials 30c and 30e are not yet set.

Figure 5:
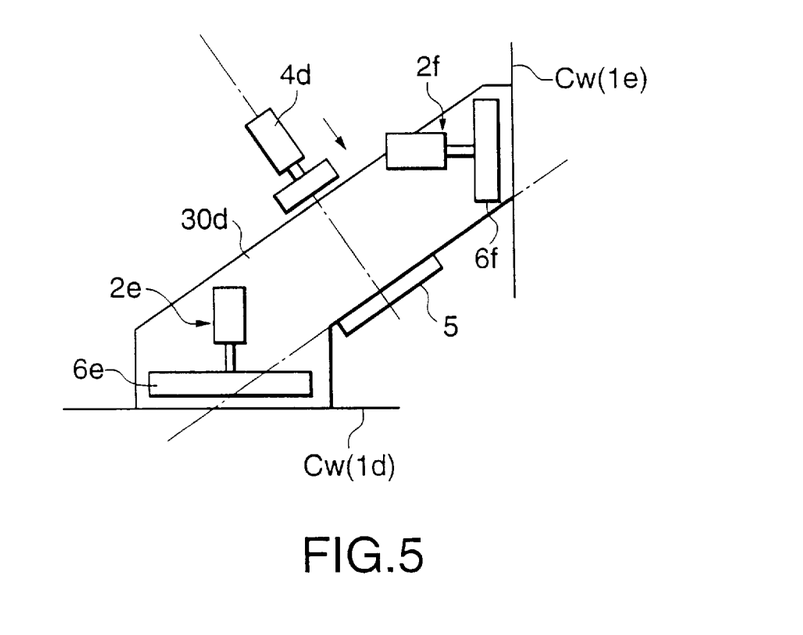
FIG. 5 is a plan view of the blank material showing a positioning state due to the positioning device.

Next, as shown in FIG. 5, the external pusher 4d extends and one side face of the blank material 30d is brought in contact with the rough guide 5 so as to perform temporary positioning. The clamp actuators 13 of the correction clamp units 2e and 2f extend, thereby gripping the blank material 30d between the correction clampers 6e, 6f, and the lower mobile pedestal bases 15.

The correction actuator 11 and lower correction actuator 17 then contract.

Figure 6:
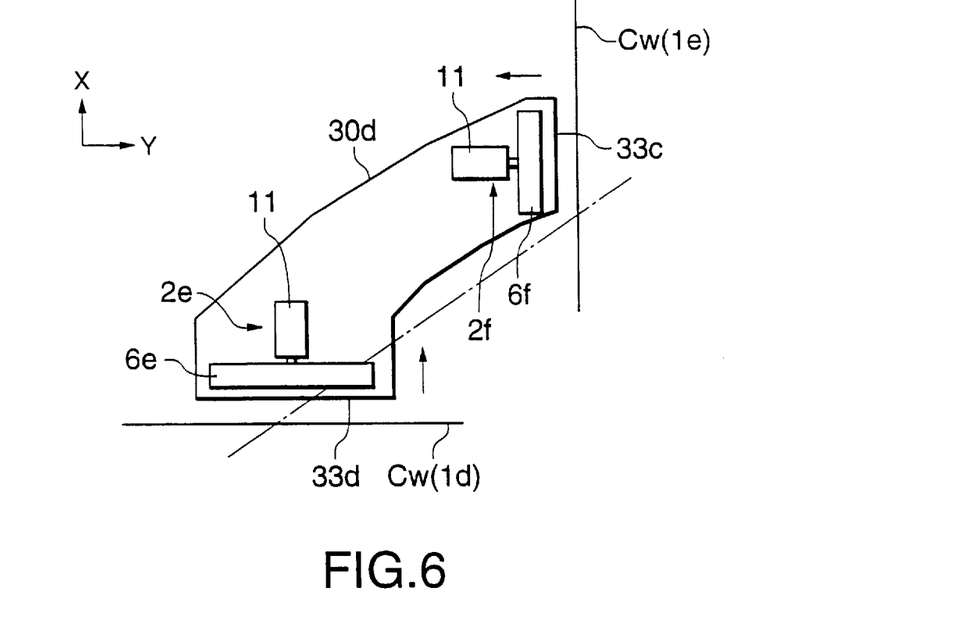
FIG. 6 is a plan view of the blank material showing a corrected positioning state due to the positioning device.
Figure 7:
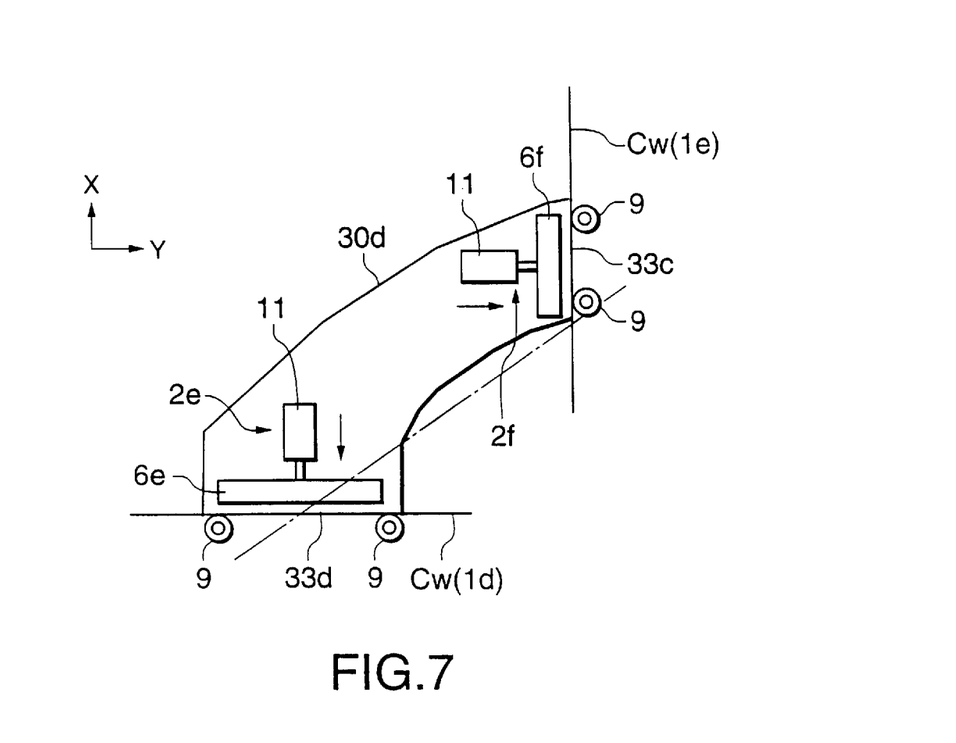
FIG. 7 is a plan view of the blank material showing a positioning complete state due to the positioning device.

This drives the correction clampers 6e, 6f and the lower mobile pedestal bases 15 in such a direction that the welding part 33d of the lower end separates from the groove 10 of the center block 1d and the welding part 33c of the upper end separates from the groove 10 of the center block 1e as shown in FIG. 6, and the middle part of the block material 30d is bent in the Z axis direction of FIGS. 2 and 3.

When the blank material 30d is bent, the reference pins 9 of the center blocks 1d and 1e are respectively made to project upward, and the correction actuator 11 and lower correction actuator 17 are driven in synchronism so that they extend. This drives the correction clampers 6e, 6f and the lower mobile pedestal bases 15 in such a direction that the welding part 33d comes in contact with the pair of reference pins 9 of the center block 1d, and the welding part 33c comes in contact with the pair of reference pins 9 of the center block 1e. This brings the welding parts 33c, 33d respectively in contact with the reference pins 9.

After the welding parts 33c, 33d of the blank material 30d are positioned over the predetermined welding line Cw, the actuators 14 extend and the region near the two ends 33c, 33d of the blank material 30d are pressed against the center blocks 1d, 1e in the fixed clampers 3d, 3e.

Next, the actuators 13 contract and the correction clampers 6e, 6f separate from the blank material 30d, and the correction actuator 11 and lower correction actuator 17 are respectively made to contract to their original positions. The pair of reference pins 9 are also made to contract and withdraw from the laser beam.

After positioning the blank material 30d in this way, the blank materials 30c is disposed in the X axis direction and the blank material 30e is disposed in the Y direction, and the welding parts 32c, 32e are positioned by the correction clampers 6d, 6g.

In this process, the correction clamper 6d displaces the blank material 30c towards the center block 1d along the X axis, as shown in FIG. 1. The edge 32c of the blank material 30c is aligned with the edge 33d of the blank material 30d which has already been positioned, and in the state where the middle part of the blank material 30c is bent in a perpendicular direction, the edge 32c of the blank material 30c is fixed by the fixed clamper 3d.

At the same time, the correction clamper 6g displaces the blank material 30e towards the center block 1e along the Y axis. The welding part 32e of the blank material 30e is aligned with the welding part 33c of the blank material 30d positioned which has already been positioned, and in the state where the middle part of the blank material 30e is bent in a perpendicular direction, the edge 32e of the blank material 30e is fixed by the fixed clamper 3e. The edges are then joined by laser beam welding. The correction clamp unit 2g including the correction clamper 6g is referred to as a driving mechanism.

As was described with reference to the aforesaid prior art, gaps may occur between the welding parts of adjacent blank materials due to manufacturing errors, etc.

The reason why this device compensates these gaps will now be described in detail referring to the models of FIGS. 8A, 8B and FIGS. 9A, 9B.

Figure 8A:
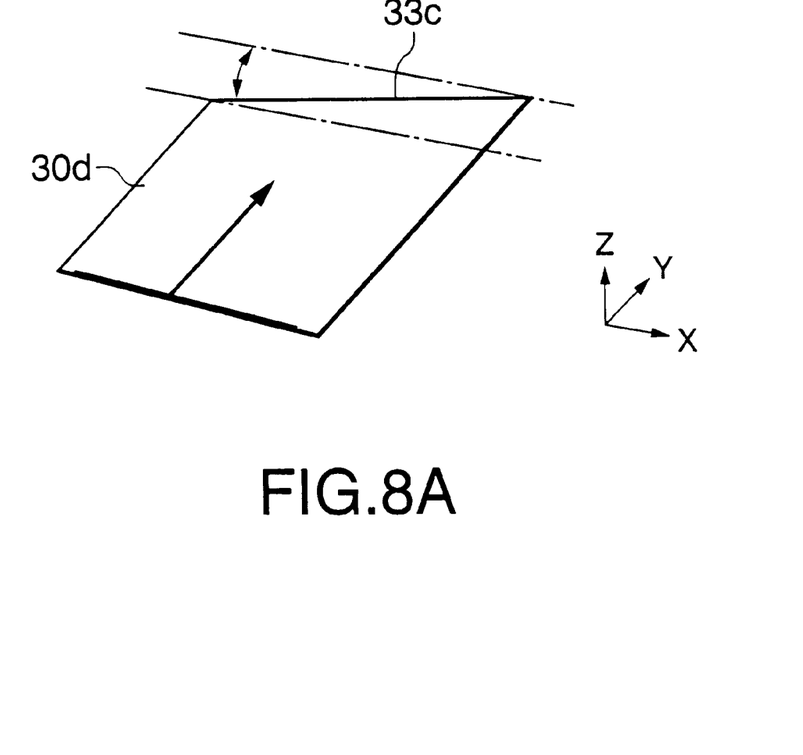
FIGS. 8A and 8B are perspective views of the blank material showing a plane correction start state and end state.

Herein, it is assumed that the welding part 33c of the blank material 30d is tilted with respect to the welding line as shown in FIG. 8A.

The blank material 30d is gripped by the correction clamper 6f and lower mobile pedestal base 15 in the X-Y plane so that its displacement in a perpendicular direction is limited. Similarly, the opposite edge of the blank material 30d is gripped by the correction clamper 6e and lower mobile pedestal base 15 so that displacement in the perpendicular direction is limited.

Figure 8B:
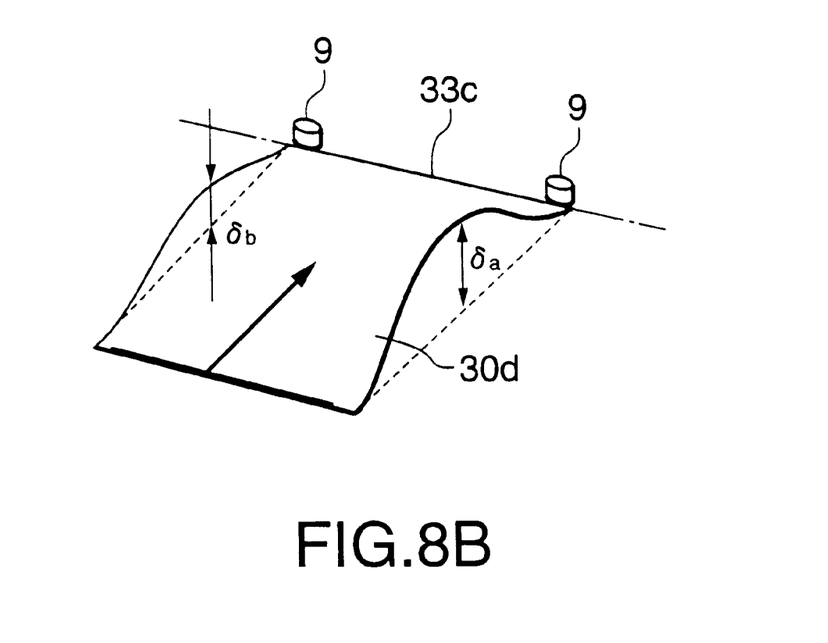
Figure 9A:
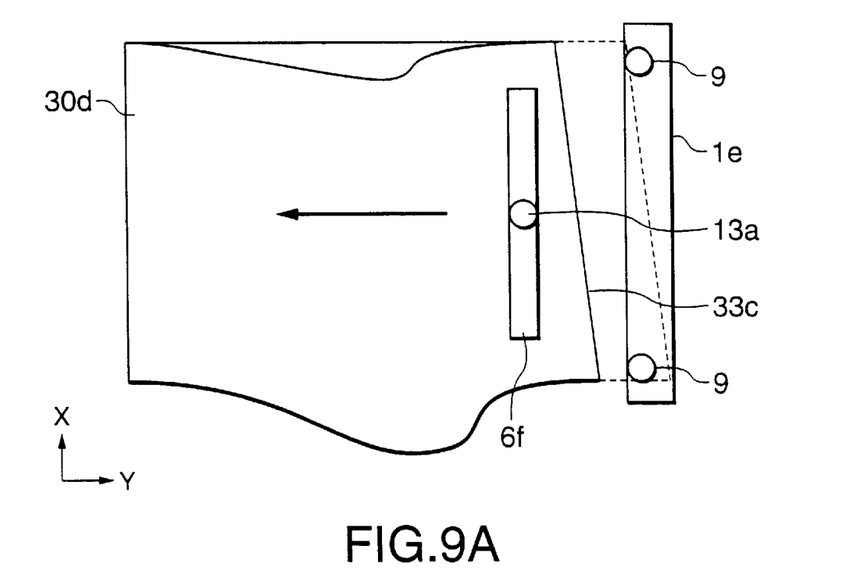
FIGS. 9A and 9B are plan views of the blank material respectively showing a starting state of contact on a reference pin of a correction clamper and positioning complete state due to the positioning device.

In this state, when the correction actuator 11 and lower correction actuator 17 are made to contract, the correction clamper 6e and lower movable pedestal base 15 are displaced in the Y axis direction, and the correction clamper 6e and lower movable pedestal base 15 are displaced in the X axis direction, the middle part of the blank material 30d buckles so that it bends in a perpendicular direction, as shown in FIG. 9A, In the state where the blank material 30d is buckled and bent, the reference pins 9 shown in FIG. 8B are set in a predetermined position, and the correction actuator 11 and lower correction actuator 17 are extended so that the welding part 33c is brought in contact with the reference pins 9. At that time, bending amounts from the reference plane are a bending amount $\delta_a$ in a part on the right of FIG. 8B which first comes in contact with the reference pins 9, and a bending amount $\delta_b$ in a part on the left of FIG. 8B which is less than $\delta_a$.

As a result, the displacement in the Z axis direction of the right-hand edge of the blank material 30d shown in FIG. 8B, is larger than the displacement in the Z axis direction of the left-hand edge. The tilt of the welding part 33c is thereby corrected so that the overall length of the welding part 33c coincides with the welding line.

Figure 9B:
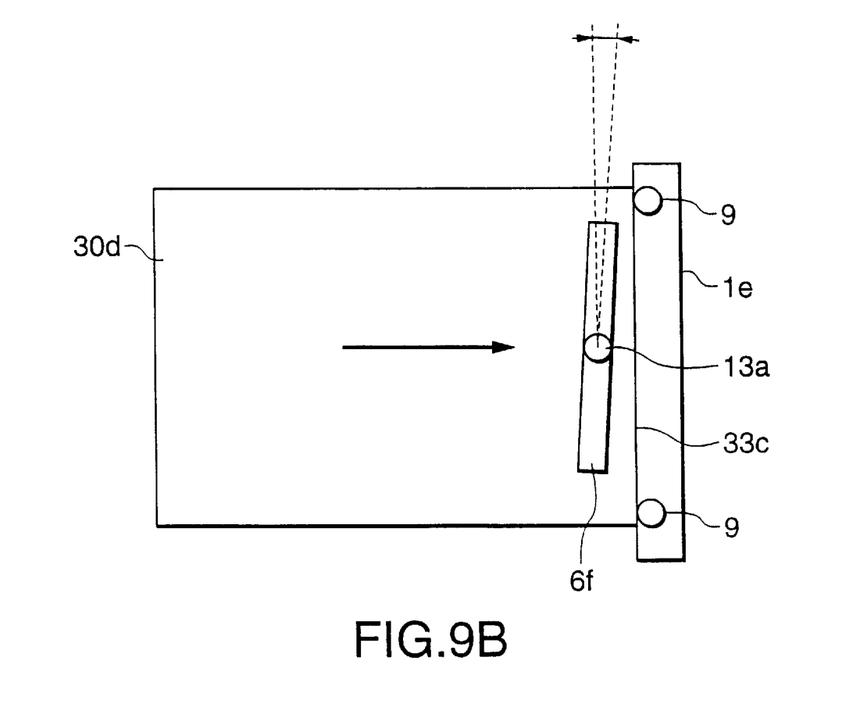

The correction clamper 6f is constructed so that it is free to rotate about a rod 13a of the clamp actuator 13. The correction clamper 6f rotates according to an amount ($\delta_a$–$\delta_b$) of the tilt of the welding part 33c, as shown in FIG. 9B.

The other correction clampers 6a–6e, 6g are similarly constructed, and bring the welding parts of the blank materials in contact with the reference pins 9 as they rotate according to the tilts of the welding parts.

As the middle parts of the blank materials 30d and 30a have to be respectively bent and positioned so that both ends of each can be joined to the other blank materials 30b and 30e, their overall lengths are respectively set to be slightly greater than the gap between the of blank materials 30c, 30e and the blank materials 30b, 30e.

After welding, the bending amounts, $\delta_b$, in the perpendicular direction shown in FIG. 8B remain but these are corrected to a predetermined plane by subsequent press molding.

In this way, the blank material 30d is pressed in contact with the reference pins 9 after buckling and bending the blank material 30d, hence the welding part 33c is precisely aligned on the predetermined welding line Cw even when there is some scatter in machining precision of the blank material 30d. Hence, a high welding quality is obtained.

Also, the correction clamper and lower mobile pedestal base grip the blank material in an up/down direction, so the gripping of the blank material may be performed regardless of the width of the blank material.

In the aforesaid description, an example was taken where the blank material 30d was aligned with the blank materials 30c, 30e. The positioning of the other blank materials 30a–30e is performed in the following order.

In FIG. 1, the blank material 30d is first positioned, and fixed by the fixed clampers 3d, 3e. Next, the blank materials 30e, 30c are positioned based on this blank material 30d. In this case, for example, the blank material 30c is temporarily positioned by the external pusher 4 and the pair of reference pins 9 on the center block 1d, the blank material 30c is gripped by the correction clamper 6d and lower mobile pedestal base 15, and the welding part 32c of the blank material 30c is pressed against the welding part 33d of the blank material 3d to the extent that bending is produced in the blank material 30c.

The blank material 30c is thereby fixed by the fixed clamper 3d without any gap between the welding parts 33d, 32c. The same is true for the blank material 30e. Subsequently, the blank material 30b is positioned in the same way.

Finally, the blank material 30a is positioned between the blank materials 30b and 30e. For this purpose, after temporarily positioning the blank material 30a using the external pusher 4a and the pair of reference pins 9 on the center blocks 1a, 1b, the blank material 30a is bent using the correction clampers 6a, 6b and lower mobile pedestal bases 15, then the welding part 32a is pressed against the welding part 33e of the blank material 30e and the welding part 33b is pressed against the welding part 33a of the blank material 30b so that these parts are fixed by the fixed clampers 3a, 3b while the correction clampers 6a, 6b and lower mobile pedestal bases 15 are returned to their original positions.

After welding is complete, the fixed clampers 3a–3e are raised, and the finished rear quarter pillar may be easily removed from the clamp units.

A second embodiment of this invention will now be described with reference to FIGS. 10–14D.

In this embodiment, five blank materials 30a–30e are joined as in the case of the aforesaid first embodiment.

Figure 10:
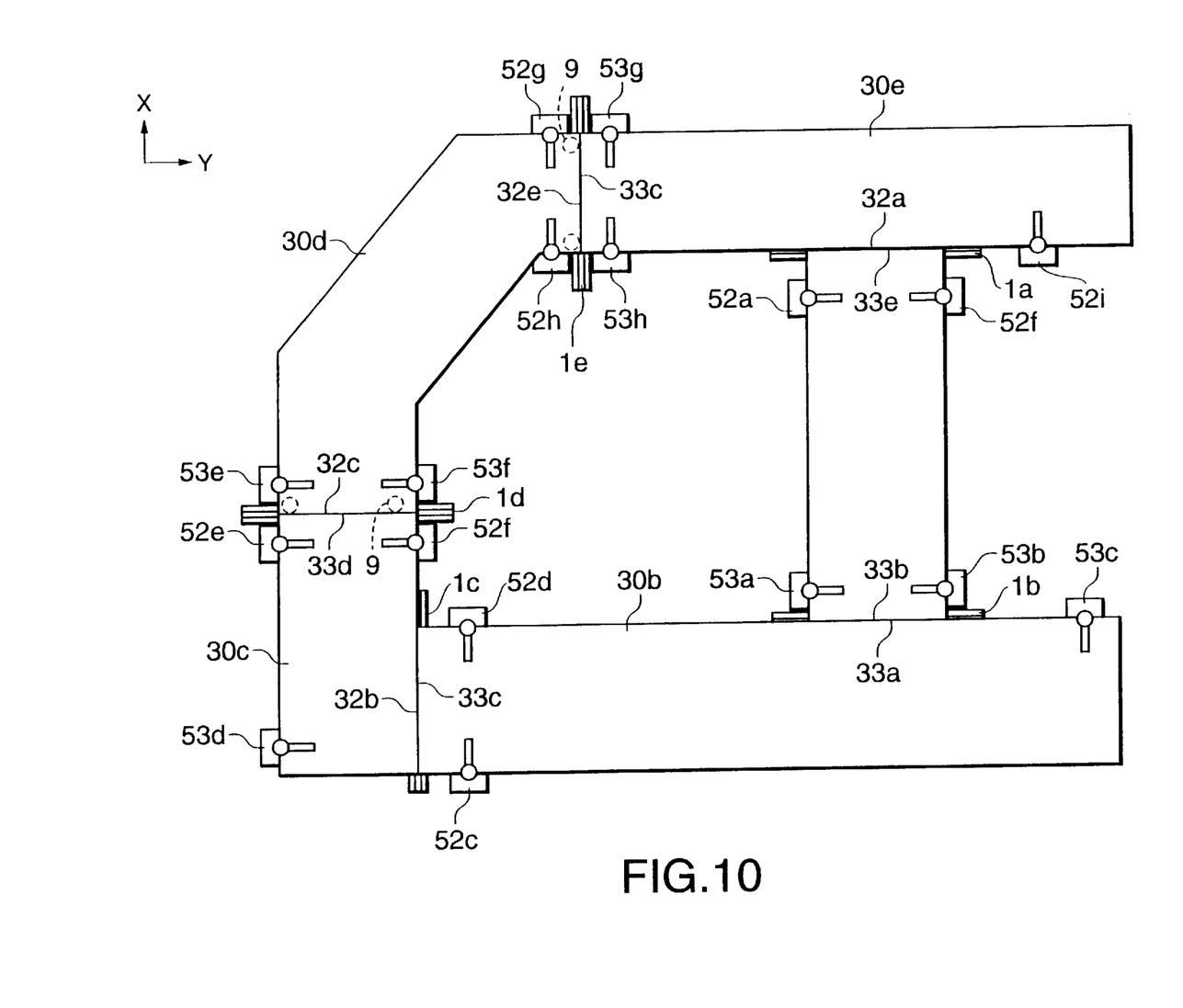
FIG. 10 is a schematic plan view of a blank material positioning device according to a second embodiment of this invention.

The constructions of the center blocks 1a–1e and grooves 10 shown in FIG. 10, and that of reference pins, not shown, are the same as that of the aforesaid first embodiment.

The blank materials 30a–30e are positioned on a predetermined welding line by clamp units 52a–52i, 53a–53h.

Regarding the blank material 30a of which the two ends are to be joined, the vicinity of the welding part 32a is gripped by the clamp units 52a, 52b, and the vicinity of the welding part 33a is gripped by the clamp units 53a, 53b as shown in FIG. 10.

Similarly, in the case of the blank material 30b, the vicinity of the welding part 32b is gripped by the clamp units 52d, 52c, and the upper part of the right edge of FIG. 10 is gripped by the clamp unit 53c.

In the case of the blank material 30c, the vicinity of the welding part 32c is gripped by the clamp units 52e, 52f, and the vicinity of the lower edge of FIG. 10 is gripped by the clamp unit 53d.

In the case of the blank material 30d, the vicinity of the welding part 33c is gripped by the clamp units 52g, 52h, and the vicinity of the welding part 33d gripped by the clamp units 53e, 53f.

In the case of the blank material 30e, the vicinity of the welding part 32e is gripped by the clamp units 53g, 53h, and the vicinity of the right edge of FIG. 10 is gripped by the clamp unit 52i.

Figure 11:
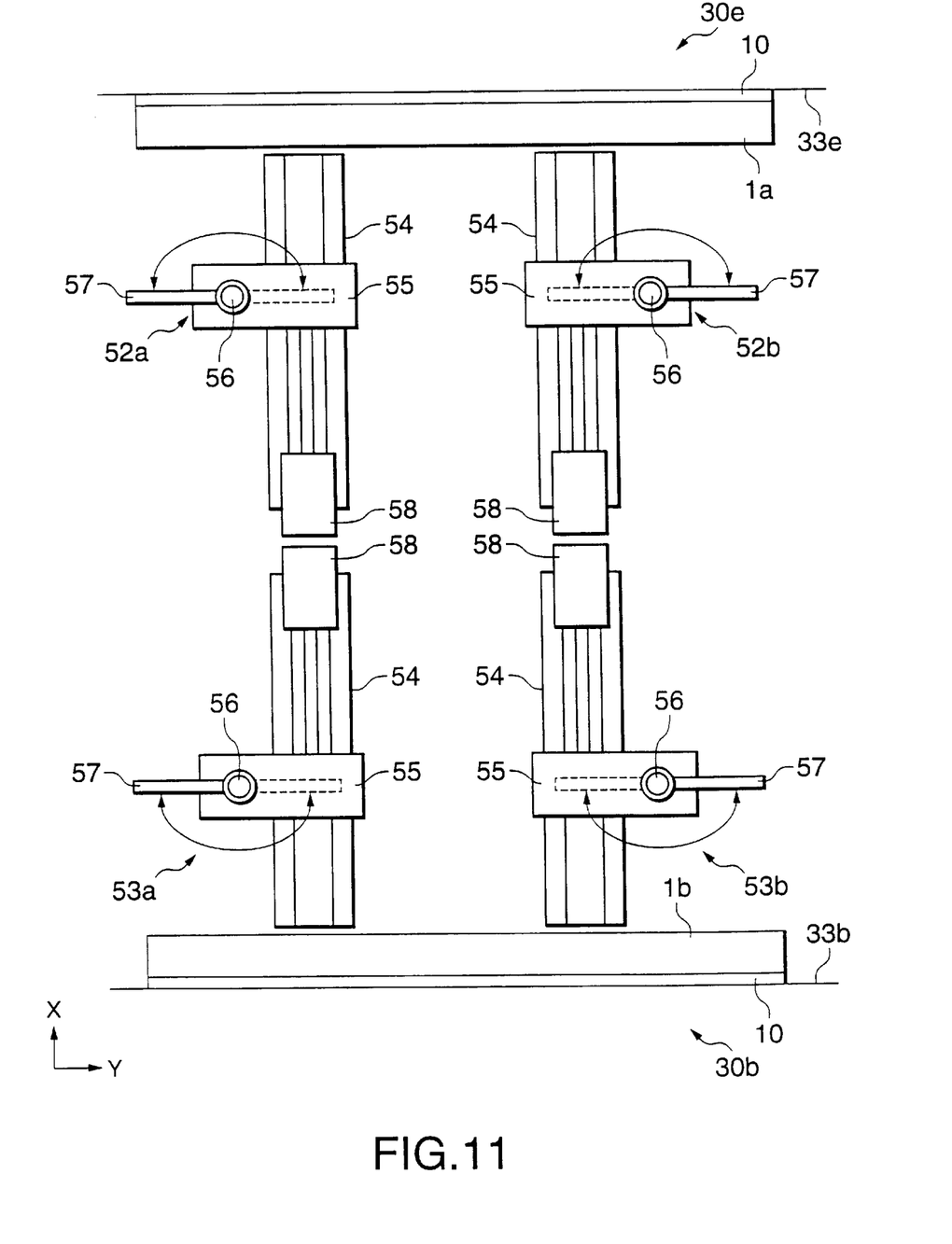
FIG. 11 is a vertical sectional view of the positioning device according to the second embodiment.
Figure 12:
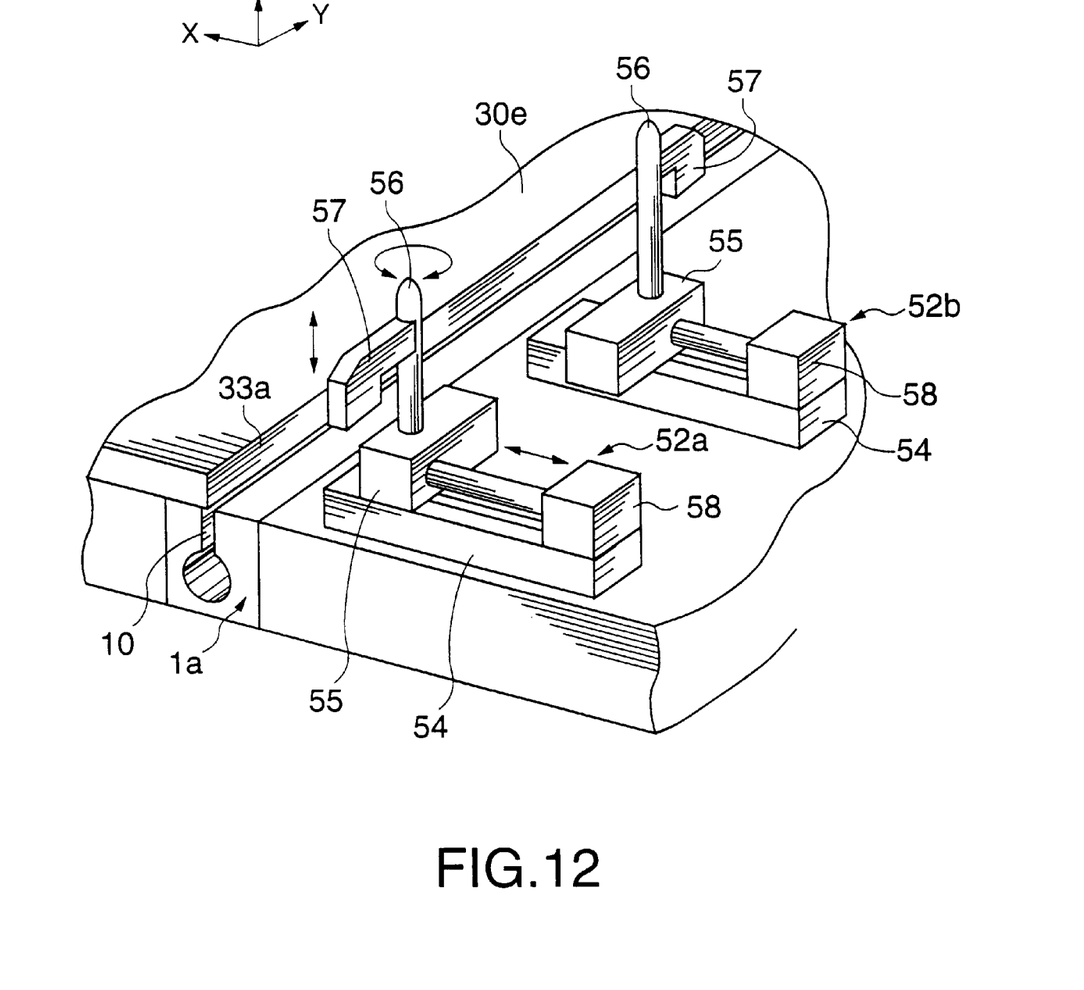
FIG. 12 is a perspective view of the essential parts of the positioning device according to the second embodiment.

In FIGS. 11 and 12, the clamp unit 52a comprises a slider 54 that extends in a perpendicular direction to the center block 1a. A mobile pedestal base 55 is supported free to slide in the X axis direction on the slider 54.

The mobile pedestal base 55 approaches or moves away from the center block 1a according to the extension/contraction of an actuator 58.

A pin 56 is installed on the mobile pedestal base 55 such that it projects upward, and a rotating clamper 57 is fixed on the pin 56. The mobile pedestal base 55 comprises an actuator which gives the pin 56 a rotational displacement within a predetermined range, and a linear displacement in the Z axis direction of FIG. 12. The upper surface of the mobile pedestal base 55 is effectively in the same plane as the upper surface of the center blocks 1a–1e.

The clamp unit 52a shown in FIG. 12 is in its initial state with the pin 56 projecting its furthest from the upper surface of the mobile pedestal base 55 and the lower surface of the rotating clamper 57 situated above the upper surface of the mobile pedestal base 55.

The rotating clamper 57 is substantially parallel to the X axis, and projects outside the mobile pedestal base 55.

On the other hand, in a grip position shown by the broken line in FIG. 11, the pin 56 is rotated 180 degrees and contracted by the actuator, not shown, such that the lower surface of the rotating clamper 57 presses the blank material 30a mounted on the upper surface of the mobile pedestal base 55, downwards.

The clamp unit 52b opposite the clamp unit 52a has a similar construction, but the relative positions of the mobile pedestal base 55, pin 56 and rotation clamper 57 are reversed with respect to the clamp unit 52a. In the initial positions of the clamp units 52a, 52b, the two pins 56 are separated from the center block 1a by a predetermined distance, and parallel to the Y axis in the figure. The initial positions of the actuators 58 are set to correspond to these positions.

The clamp unit 53a has a similar construction to that of the clamp unit 52a, and the clamp unit 53b has a similar construction to that of the clamp unit 52b. The other clamp units 52c–52i, 53c–53h shown in FIG. 10 also have a similar construction to that of the clamp units 52a and 52b.

Figure 13:
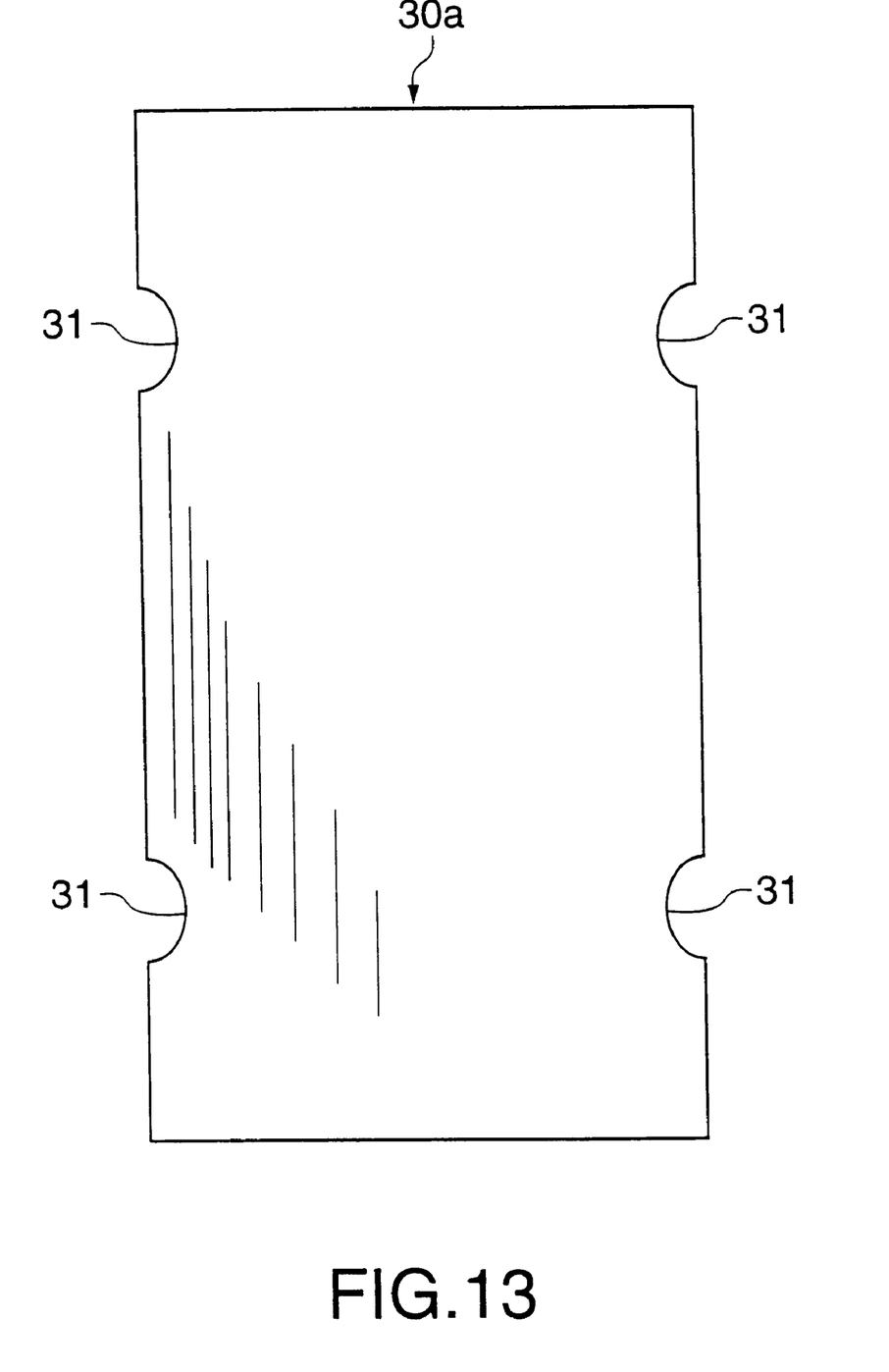
FIG. 13 is a plan view of a blank material according to the second embodiment.

In addition, notches 31 which engage with the pins 56 in the initial position of the clamp units 52a, 52b, 53a and 53b, are formed at four positions on the outer circumference of the blank material 30a, as shown in FIG. 13. The notches 31 which can engage with the pins 56 of the clamp units 52c–52i and 53c–53h are also formed in the other blank materials 30b–30e.

Next, the operation of positioning the blank material 30a will be described with reference to FIGS. 14A–14D. It will be assumed that when the blank material 30a is positioned, positioning of the blank materials 30b and 30e is already complete.

Figure 14A:
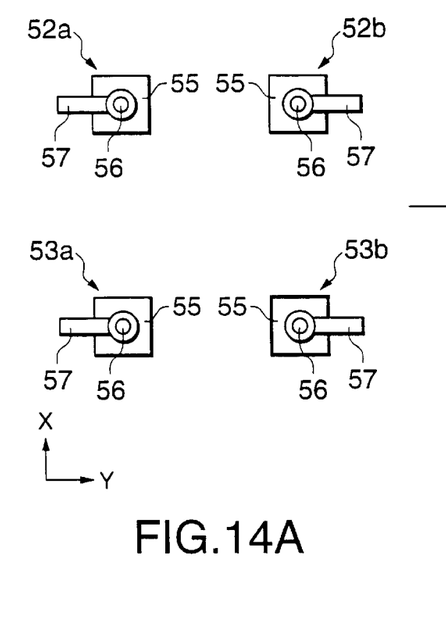
FIGS. 14A–14D are descriptive drawings showing a positioning operation of the positioning device according to the second embodiment.

First, each of the mobile pedestal bases 55 is maintained in a predetermined initial position, the pins 56 are extended to their maximum length, and the rotating clamper 57 is maintained in its initial position as shown in FIG. 14A.

The rotating clamper 57 is thereby positioned on an extension in the Y direction of a line joining the pins 56.

Figure 14B:
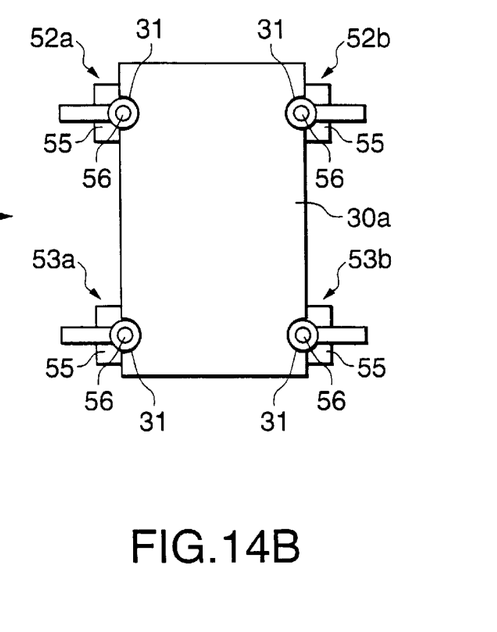

Next, the blank material 30a is mounted on the four mobile pedestal bases 55. The blank material 30a is then effectively temporarily positioned in its predetermined position by respectively engaging the four notches 31 on the outer circumference of the blank material 30a with the pins 56. In this state, the welding part 32a of the blank material 30a overlaps with part of the welding part 33e of the blank material 30e. Also, the welding part 33a of the blank material 30a overlaps with part of the welding part 33b of the blank material 30b.

The pins 56 of the clamp units 52a, 52b, 53a and 53b are then rotated 180 degrees, and the pins 56 are contracted so that the blank material 30a is gripped by the lower surface of the rotating clamper 57 and the mobile pedestal base 55.

Figure 14C:
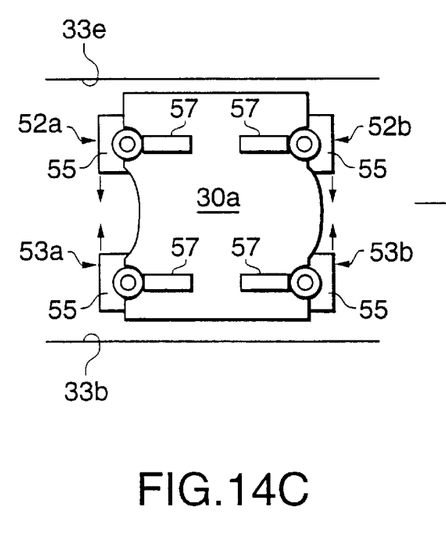

Subsequently, as shown in FIG. 14C, the actuators 58 are contracted in synchronism, the clamp units 52a, 52b are separated from the welding part 33e, and the clamp units 53a, 53b are separated from the welding part 33b. This causes the middle part of the blank material 30a to buckle.

Figure 14D:
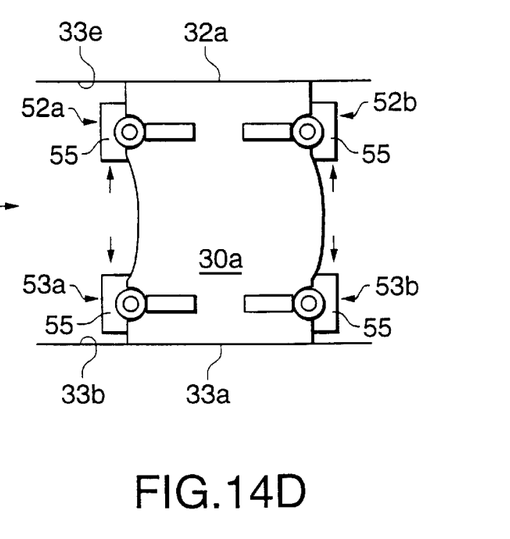

Then, as shown in FIG. 14D, the actuators 58 are extended, the clamp units 52a, 52b are displaced towards the welding part 33e, the clamp units 53a, 53b are displaced towards the welding part 33b, and the edges of the blank material 30a are brought in contact with these welding parts 33e, 33b.

When both edges of the blank material 30a are in contact with the welding parts 33e, 33b over their whole area, the extension of the actuators is stopped and the positioning operation is terminated.

Subsequently, when the welding line on the center blocks 1a, 1b is irradiated by the laser welding gun, the blank material 30a is welded to the blank materials 30b, 30e on either side of it as in the aforesaid prior art example.

According also to this embodiment, the blank material 30a is brought in contact with the blank materials 30e, 30b after its middle part is first made to buckle, hence the welding part 32a of the blank material 30a is completely joined to the welding part 33e of the blank material 30e, and the welding part 33a of the blank material 30a is completely joined to the welding part 33b of the blank material 30b, without producing any gaps in either case. As a result, laser beam welding can be performed with high precision.

In FIGS. 14A–14D, the welding parts 32a, 33a at the ends of the blank material 30a are respectively brought in contact with the sides of the blank materials 30b, 30e which were positioned first. The positioning of the blank materials 30b–30e proceeds in the following order.

In FIG. 1, the welding part 32e of the blank material 30e is pressed against the pair of reference pins 9 of the center block 1e using the clamp units 53g, 53h and 52i so as to position the blank material 30e. The welding part 32c of the blank material 30c is also pressed against the pair of reference pins 9 of the center block 1d using the clamp units 52e, 52f and 53d so as to position the blank material 30c.

Next, the welding part 32b is pressed against the welding part 33c of the side of the blank material 30c using the clamp units 52c, 52d and 53c so as to position the blank material 30b.

For the blank materials 30b, 30c, 30e of which only one edge is joined to another blank material, only one of the clamp units may be used to clamp the free edge which is not joined to another blank material.

After positioning the blank materials 30b, 30c and 30e, the blank material 30a is positioned between the blank materials 30b, 30e by the aforementioned method. The blank material 30d which is positioned between the blank materials 30c, 30e, is positioned by the same method.

In this way, potential gaps between the welding parts are corrected, and laser beam welding is performed properly.

As the clamp units 52a–52i, 53a–53h are disposed on the same floor surface as the center blocks 1a–1e, there is no need to position the clamps above the blank materials, and installation of the positioning device is simplified.

After welding, the pins 56 of the clamp units are extended, and the rotating clamp 57 is rotated to the initial position where it does not interfere with the upper surface of the blank material, i.e. the position shown in FIG. 11, and the finished rear quarter pillar may be easily removed from the clamp units.

The embodiments of this invention in which an exclusive property or privilege is claimed are defined as follows:

What is claimed is:

1. A blank material positioning device for aligning a first blank material and a second blank material disposed in a horizontal plane such that edge faces of the blank materials are aligned on a predetermined welding line, comprising:

a positioning member that contacts, and is separable from, a first edge face of the first blank material on the welding line;

a first clamp that grips the first blank material from above and beneath the first blank material;

a first actuator that drives the first clamp in a perpendicular direction, which perpendicular direction is perpendicular to the welding line in the horizontal planes to cause the first blank material to buckle and to cause the first edge face to contact the positioning member;

a second clamp disposed between the positioning member and the first clamp that holds the first blank material in a buckled state while keeping the first edge face on the welding line; and a driving mechanism that drives the second blank material towards the welding line.

2. A blank material positioning device as defined in claim 1, wherein the positioning member comprises a plurality of pins that extend and contract vertically and are disposed along the welding line.

3. A blank material positioning device as defined in claim 1, wherein the first clamp is constructed so as to permit a rotational displacement of the first blank material in the horizontal plane.

4. A blank material positioning device as defined in claim 3, wherein the first clamp comprises:

a first lower pedestal base situated under the first blank material;

a first clamp member facing the first lower pedestal base from above and rotatable relative to the first lower pedestal base; and a second actuator that drives the first clamp member towards the first lower pedestal base, wherein the first actuator is an actuator that drives the first lower pedestal base and the first clamp member in the perpendicular direction in the horizontal plane.

5. A blank material positioning device as claimed in claim 4, further comprising a guide pin that guides the first lower pedestal base and the first clamp member in the perpendicular direction.

6. A blank material positioning device as claimed in claim 1, further comprising, a supporting mechanism that supports the first blank material at a second edge face that is opposite to the first edge face, wherein the first actuator is arranged to drive the first clamp, which has gripped the first blank material, such that the first edge retreats from the welding line so as to cause the first blank material to buckle and to drive the first clamp towards the positioning member after the first blank material buckles.

7. A blank material positioning device as claimed in claim 6, wherein the supporting mechanism comprises:

a second lower pedestal base situated under the first blank material;

a second clamp member that faces the second lower pedestal base from above and that is rotatable relative to the second lower pedestal base;

a third actuator that drives the second clamp member towards the second lower pedestal base; and a fourth actuator that supports the second clamp member and the second lower pedestal base against a horizontal load.

* * * * *